C. W. SPICER.
INCASED UNIVERSAL JOINT AND CASING THEREOF.
APPLICATION FILED SEPT. 12, 1906.
1,051,025.
Patented Jan. 21, 1913.
2 SHEETS—SHEET 2.
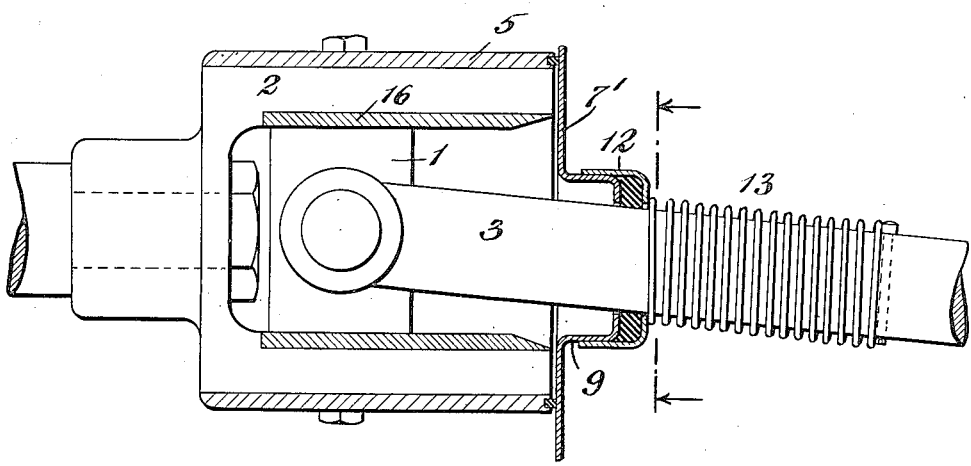
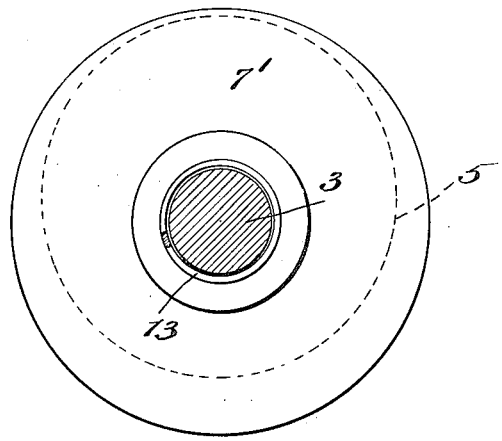

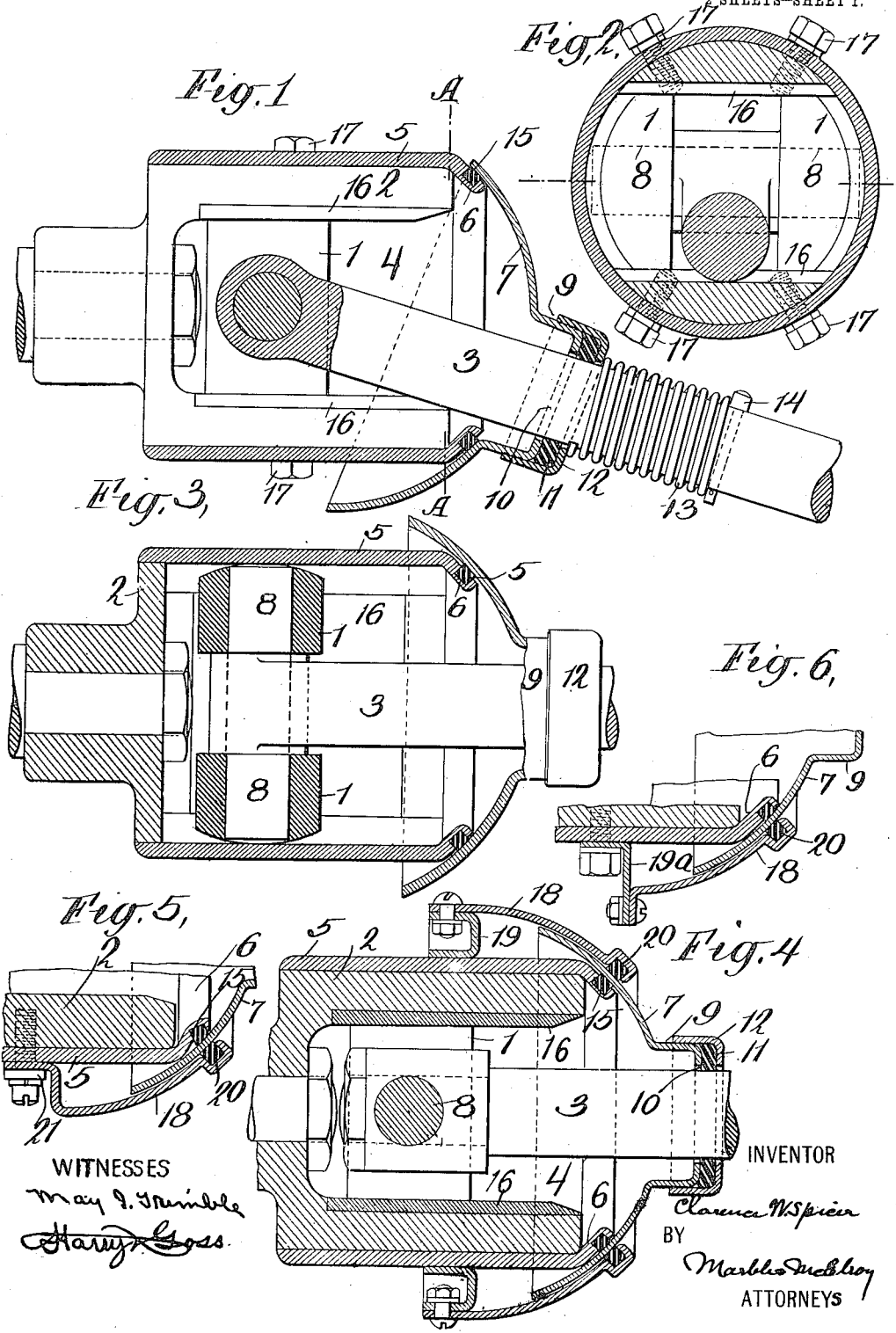

UNITED STATES PATENT OFFICE.

CLARENCE W. SPICER, OF PLAINFIELD, NEW JERSEY.

INCASED UNIVERSAL JOINT AND CASING THEREOF.

1,051,025.   Specification of Letters Patent.   Patented Jan. 21, 1913.

Application filed September 12, 1906. Serial No. 334,222.

*To all whom it may concern:*

Be it known that I, CLARENCE W. SPICER, a citizen of the United States, residing at Plainfield, in the county of Union and State of New Jersey, have invented certain new and useful Improvements in Incased Universal Joints and Casings Thereof; and I do hereby declare the following to be a full, clear, and exact description of the same, such as will enable others skilled in the art to which it appertains to make and use the same.

My invention relates to improvements in incased universal joints and in the casings of such joints, and comprises a casing particularly applicable to the class of universal joints comprising an intermediate member, and driving and driven members one of which is pivotally connected to said intermediate member and the other of which has a sliding connection with said intermediate member. Joints of the so-called "T-head in a slot" type are of the class referred to. Such joints are commonly used in the driving mechanism of certain well-known motor vehicles, and are also adapted for use in boats and in machinery generally wherever a universal joint is required. My improved casing is so constructed as to inclose such joints, excluding dirt, dust, and the like from the working parts thereof, and when so desired serving also as a reservoir to contain lubricant by which the wearing surfaces of the joint are kept lubricated at all times.

My invention consists in the novel construction of the casing, and in the combination of a casing such as described with joints of the class described, and in other features of invention hereinafter described and particularly pointed out in the claims.

The objects of my invention are, to inclose in an improved manner joints of the class described; to prevent dirt, dust and the like from reaching the wearing surfaces of such joints; to retain lubricant in such joints; and to make the casing simple, compact, neat in appearance, and relatively inexpensive.

I will now proceed to describe my invention with reference to the accompanying drawings, in which one type of said joint and certain types of casings therefor embodying my invention are illustrated, and will then point out the novel features in claims.

In the said drawings: Figure 1 shows a central longitudinal section of a universal joint and a casing therefor embodying my invention. Fig. 2 shows a transverse section of such joint on the line A—A of Fig. 1. Fig. 3 shows a longitudinal section of said joint and casing on a plane at right angles to that of Fig. 1. Fig. 4 is a longitudinal sectional view illustrating an alternative form of such casing; and Figs. 5 and 6 are further detail longitudinal sectional views illustrating further alternative constructions of such casing. Fig. 7 shows a central longitudinal section of still another incased universal joint having a flat end plate, and Fig. 8 is an end view of such joint.

Referring now to the drawings, and at first to Figs. 1, 2 and 3 thereof, 1 designates the said intermediate member of the universal joint, and 2 and 3 end members thereof, of which either may be the driving member and the other the driven member. In the construction shown, member 2 is a block of generally cylindrical outer contour, having in it a transverse slot or slide-way 4, in which the intermediate member 1 is adapted to slide, said block being surrounded by a cylindrical jacket 5 serving to confine the sliding intermediate member 1 against lateral escape from said slide-way. This jacket 5 has at one end a lip 6 which coacts with the spherically-curved casing member 7 hereinafter mentioned.

The member 3 of the joint is pivoted on a trunnion-pin 8 of intermediate member 1. Upon said member 3 is mounted said casing member 7, which is a spherically-curved shell, embracing the said lip 6 of jacket 5, and having a neck-portion 9 in which is an aperture 10 through which the member 3 of the joint passes. Casing member 7 is further provided with packing material 11 just outside this aperture 10 and surrounding the joint member 3 and held in place by a cap 12. A spring 13 surrounding said joint member 3 and abutting at its rear end against a pin 14, tends to press casing member 7 against the lip 6 at the end of joint member 2. It will be seen that the relative relation of jacket 5 and the end member 7 of the casing is such that with the movements of joint member 3 with respect to the other members of the joint the end member 7 moves back and forth over the end of the jacket, being pressed against the end of the jacket at all times, however, and so keeping the casing closed. To aid in forming a tight joint between end member 7 and lip 6, I customarily provide packing material 15 between said members. Such packing material besides excluding dirt and dust retains lubricant within the casing and enables the casing to serve as a reservoir for lubricant.

Joint member 2 is provided with removable wearing faces 16. Screws 17 hold together the parts of member 2. As shown particularly in Fig. 3, the ends of block 1 are spherically curved, so that said block besides sliding in the slideway in member 2, may also pivot therein from side to side. Such motion of intermediate member 1, and pivotal motion of joint member 3 with reference to member 1, gives the necessary "universal" movement. Member 1 being free to slide longitudinally with reference to member 2, the joint combines in a single structure, both a universal joint and the slip joint usually required in connection with universal joints. Inasmuch as the position of member 1 is not absolutely fixed with reference to member 2, but may vary somewhat, casing member 7 may not be rigidly secured to joint member 3, but must be held up against the end of member 2 by suitable means. Spring 13 performs this function.

It will be seen that the casing completely closes the end of the universal joint, in all operative positions of the parts thereof.

In Fig. 4 I illustrate alternative means for holding the casing member 7 up against the end of joint member 2. In this case a spherically curved casing member 18, secured to jacket 5 by a ring 19, and embracing casing member 7, performs such function. In the construction shown in Fig. 4 I customarily provide casing member 18 with packing material 20. Except as to this casing member 18, the joint and casing are substantially the same as the corresponding parts shown in Figs. 1, 2 and 3.

Figs. 5 and 6 show means for holding the casing member 7 in position, alternative to that shown in Fig. 4. In the construction shown in Fig. 5, this casing member 18 has a flange 21 fitting closely to the jacket 5, casing member 7 playing between the end of jacket 5 and casing member 18.

In the construction shown in Fig. 6, instead of employing a ring 19 of U-section, as in Fig. 4, I employ a suitable flanged ring 19ª.

The end member 7 of the casing is not necessarily spherically curved, or curved at all. In the construction shown in Figs. 7 and 8, said end member, 7', is a flat disk playing across the square-cut end of jacket 5, and pressed up against said end by spring 13. In this construction, end member 7' is concentric with jacket 5 only when joint-members 2 and 3 are in line.

What I claim is:—

1. An incased universal joint structure comprising in combination a driving member and a driven member, one of which members is slotted laterally, an intermediate member mounted in a slot of such slotted member and arranged to slide therein, and pivotally connected to the other of said driving and driven members, a casing surrounding said slotted member, a rigid end member mounted on the member so pivoted to said intermediate member, and adapted to close the end of the casing, such end member being unconnected with and free to move with respect to both such slotted member and casing, and means for holding said end member against the end of said casing.

2. An incased universal joint structure comprising in combination a driving member and a driven member, one of which is slotted laterally, an intermediate member mounted in the slot of said slotted member and arranged to slide therein, and pivotally connected to the other of said driving and driven members, a casing surrounding said slotted member, and having a lip projecting therebeyond and turned inward, an end member mounted on the member so pivoted to said intermediate member and adapted to play across and to close the end of said casing, and means for holding said end member against said lip.

3. An incased universal joint structure comprising in combination a driving member and a driven member, one of which members is slotted laterally, an intermediate member mounted in a slot of such slotted member and arranged to slide therein, having curved ends, and pivotally connected to the other of said driving and driven members, a casing surrounding said slotted members, a rigid end member mounted on the member so pivoted to said intermediate member, and adapted to close the end of the casing, such end member being unconnected with and free to move with respect to both such slotted member and casing, and means for holding said end member against the end of said casing.

4. An incased universal joint structure comprising in combination a driving member and a driven member, one of which is slotted laterally, sliding blocks mounted in the slot of said slotted member to slide therein, means pivoting the other of said members to said blocks, a casing surrounding said slotted member, a rigid end member mounted on the member so pivoted to said blocks, and adapted to close the end of the casing, such member being unconnected with and free to move with respect to both such slotted member and casing, and means for holding said end member against the end of said casing.

5. An incased universal joint structure comprising in combination universally-jointed driving and driven members having longitudinal movement relative to each other, and means inclosing the same comprising a casing mounted on one of said members, a rigid end member for closing the end of said casing mounted on the other of said members and arranged to play across the end of said casing, and means for holding said end member against said casing member.

6. An incased universal joint structure comprising in combination driving and driven members having a T-head-in-slot connection, a casing on one of said members and a rigid end cap for said casing on the other of said members, and means for pressing said cap against said casing.

7. An incased universal joint structure comprising in combination driving and driven members having a T-head-in-slot connection, a casing on one of said members, and a rigid end cap for said casing on the other of said members, means for pressing said cap against said casing, and packing between said end member and cap.

8. An incased universal joint structure comprising in combination universally-jointed driving and driven members having longitudinal movement relative to each other, and means inclosing the adjacent ends of said members comprising a casing mounted upon and surrounding one of said members, and having an opening through which the other of such members passes, and a rigid closure for such opening mounted upon such other member and movable therewith with respect to said casing.

9. An incased universal joint structure comprising in combination driving and driven members having a T-head-in-slot connection, and means inclosing the adjacent ends of said members comprising a casing mounted upon and surrounding one of said members, and having an opening through which the other of such members passes, and a rigid closure for such opening mounted upon such other member and movable therewith with respect to said casing.

10. An incased universal joint structure comprising in combination driving and driven members, one of which is provided with internal guides for a longitudinal sliding member, a sliding member mounted in such guides and pivoted to the other of said driving and driven members, a rigid end closure mounted on such other member and means pressing the closure against the end of the member having guides, and closing the same.

11. An incased universal joint structure comprising in combination a driving member and a driven member, one of which members is slotted laterally, an intermediate member mounted in the slot of said slotted member and arranged to slide therein, and pivotally connected to the other of said driving and driven members, a casing surrounding said slotted member and having at its end a projecting lip forming a relatively broad bearing surface for the hereinafter mentioned end member, an end member mounted on the member so pivoted to said intermediate member and adapted to bear against the said lip, and to play across and close the end of said casing, and means for holding said end member against said lip.

In testimony whereof I affix my signature, in the presence of two witnesses.

CLARENCE W. SPICER.

Witnesses:
 Asa F. Randolph,
 Joseph A. Hubbard.